United States Patent [19]

Sennik

[11] 3,863,096

[45] Jan. 28, 1975

[54] SPOT KILLER NETWORK FOR CATHODE RAY TUBE

[75] Inventor: John J. Sennik, Kitchener, Ontario, Canada

[73] Assignee: Electrohome Limited, N. Kitchener, Ontario, Canada

[22] Filed: July 2, 1973

[21] Appl. No.: 375,600

Related U.S. Application Data

[63] Continuation-in-part of Ser. No. 242,697, April 10, 1972, abandoned.

[52] U.S. Cl. .................................................. 315/20

[51] Int. Cl. ............................................ H01j 29/70

[58] Field of Search ......... 315/20, 27 TD, 27 R, 28, 315/29

[56] References Cited

UNITED STATES PATENTS 3,448,328 6/1969 Horio et al. ........................... 315/20

3,555,348 1/1971 Martin ................................. 315/20

*Primary Examiner*—Maynard R. Wilbur

*Assistant Examiner*—J. M. Potenza

*Attorney, Agent, or Firm*—Sim & McBurney

[57] ABSTRACT

The accelerator grid of the electron gun of the cathode ray tube of a television receiver, for example, is biased positive relative to the potential of the cathode of the tube by being connected to a suitable source of potential via a diode and also to a capacitor, the latter being connected in a circuit to be charged from the power supply via the diode. The high positive potential (relative to that of the cathode) of the accelerator grid propels electrons out of the cathode and causes them to discharge the high voltage capacitor of the tube before the raster collapses after the receiver is switched off.

3 Claims, 1 Drawing Figure

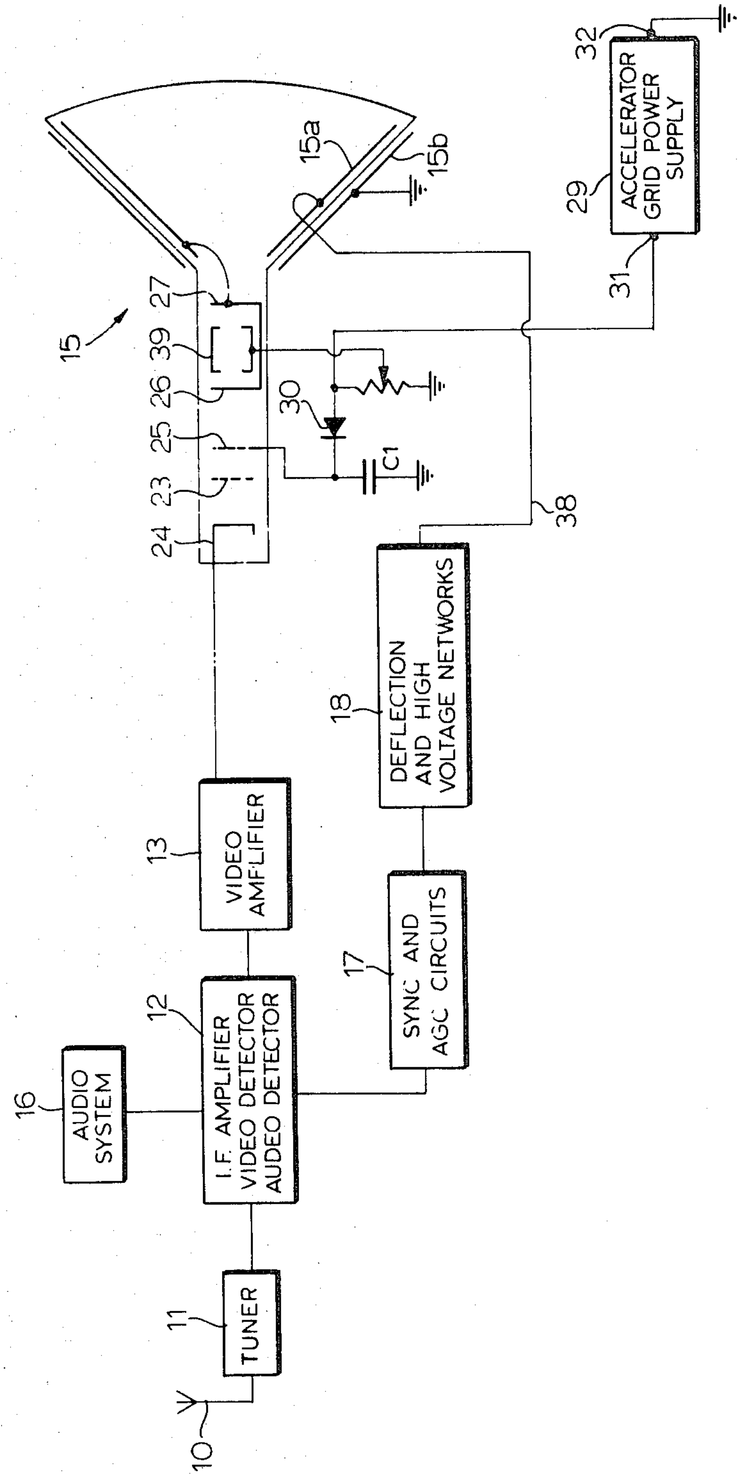
TUNER
I.F. AMPLIFIER
VIDEO DETECTOR
AUDEO DETECTOR
AUDIO SYSTEM
VIDEO AMPLIFIER
SYNC AND AGC CIRCUITS
DEFLECTION AND HIGH VOLTAGE NETWORKS
ACCELERATOR GRID POWER SUPPLY
C1
10
11
12
13
15
15a
15b
16
17
18
23
24
25
26
27
29
30
31
32
38
39

SPOT KILLER NETWORK FOR CATHODE RAY TUBE

This application is a continuation-in-part of application Ser. No. 242,697 filed Apr. 10, 1972 now abandoned.

BACKGROUND OF THE INVENTION

This invention relates to so-called spot killer networks for cathode ray tubes.

A conventional cathode ray or picture tube has an aluminum coating on the inside of the tube and a conductive coating on the outside of the tube. The glass of the picture tube is sandwiched between these two coatings or films. The two conductive films form a capacitor which becomes positively charged in use. Typically this capacitor has a capacitance of 1,000 pf and operates at a potential of up to about 25 KV. When the picture tube is tuned off, the filament and the cathode remain warm for some time and electrons are propelled by the high positive potential of the aforesaid capacitor from the cathode to the screen of the picture tube. Since there is no deflection of these electrons, they impinge on the screen in a particular spot and can "burn" the phosphor in that spot.

A number of different techniques have been tried for solving the foregoing problem. Thus it is known, simultaneously with the switching off of the picture tube, to switch a suitable negative voltage to the control grid of the picture tube to prevent electrons from moving to the screen of the picture tube. This solution to the problem is relatively expensive because of the switching that is involved and the necessity of a negative power supply.

It also is known to connect the accelerator grid of the picture tube to a source of positive D.C. potential via a resistor, this grid also being connected to a capacitor that is connected to be charged from the source of D.C. potential via the resistor. The capacitor becomes charged to the potential of the D.C. source, say, +600 volts. When the picture tube is turned off, the high positive potential of the accelerator grid propels electrons out of the cathode and causes them to discharge the high voltage capacitor of the picture tube before the raster collapses. Thus, in contrast to the technique described in the preceding paragraph where electrons are inhibited from reaching the screen of the picture tube, in accordance with the technique described in this paragraph, a flood of electrons reaches the screen of the picture tube before the raster collapses and discharges the high voltage capacitor so that further electrons are not attracted to the screen after the raster has collapsed. The problem with this technique is that a relatively large resistor must be employed, so the capacitor takes a long time to charge. Thus the network does not function properly if the picture tube is turned on and off rapidly. Moreover, when the picture tube is turned off, the D.C. potential of the source connected to the accelerator grid becomes ground potential and the capacitor begins to discharge via the resistor just at the point when a high positive voltage on the accelerator grid is desirable.

SUMMARY OF THE INVENTION

In accordance with this invention the problems of the R-C spot killer network described in the preceding paragraph are overcome by a network in which the resistor is replaced by a unidirectional conducting device such as a diode, for example. The advantage of such a spot killer network is that the capacitor will charge quickly through the diode because of its low forward resistance. On the other hand, the capacitor will discharge only very slowly through the diode when the picture tube is turned off because of the high reverse resistance of the diode.

BRIEF DESCRIPTION OF THE DRAWING

This invention will become more apparent from the following detailed description, taken in conjunction with the drawing which is a schematic showing the invention as applied to a conventional monochrome television receiver.

DESCRIPTION OF A PREFERRED EMBODIMENT

Those skilled in the art will appreciate that the television receiver shown in the FIGURE employs conventional components for the most part, so that only a brief description will be given herein of the conventional components of the receiver of the FIGURE and their mode of operation.

An antenna 10 is connected to the input circuit of a tuner 11 that comprises one or more radio frequency (R.F.) amplification stages and a first detector. The signal to which the tuner is amplified by the R.F. amplifier or amplifiers and detected, the detected signal then being applied to a system designated 12 containing one or more intermediate frequency (I.F.) amplifiers, a video detector and an audio detector. The detected signal from tuner 11 is amplified by the one or more I.F. amplifiers and the audio and video components of the signal are detected in system 12.

Video signal is amplified by a video amplifier 13 and then is applied to the cathode 24 of the electron gun of a conventional black and white picture tube 15.

The detected audio signal is supplied to a system 16 desinated audio system and comprising a limiter, a discriminator, an audio frequency (A.F.) amplifier of one or more stages and a loudspeaker, the audio signal thereby being reproduced in a well known manner.

Synchronizing (sync) information is derived by one of the detectors in system 12 and is applied to a system 17 consisting of a sync amplifier, sync separator and noise gate. The sync signal output from system 17 is applied to a system 18 containing the scanning and high voltage networks of the receiver. More specifically, system 18 comprises a horizontal scanning signal generator consisting of a line frequency oscillator, a phase detector and a frequency control stage for providing automatic control of the oscillator frequency; and a vertical scanning signal generator. A horizontal scanning signal is developed and applied to the primary winding of an output transformer (not shown) having its secondary winding connected to the horizontal scanning coil (not shown) of the deflection yoke (not shown) of the receiver. A vertical scanning signal is developed and is coupled to the vertical scanning coil (not shown) of the deflection yoke of the receiver. One high voltage D.C. voltage ouput line 38 of the high voltage network of system 18 also is connected to picture tube 15, i.e., to the aluminized coating 15*a* on the inner surface of the picture tube.

An automatic gain control system may be included within system 17 to develop an A.G.C. potential for application to tuner 11 and one of the I.F. amplification stages in system 12, as is well known.

Referring specifically to picture tube 15, the electron gun thereof includes a cathode 24, a control grid 23, an accelerator grid 25, a first anode 26 a second anode 27 and a focus electrode 39. The electron gun that is shown in the FIGURE is merely representative of one of a number of different types of electron guns with which the instant invention can be used. However, all of these electron guns are characterized by having a cathode, a control grid, an accelerator grid and an anode. The control grid is interposed between the accelerator grid and the cathode and the accelerator grid is interposed between the control grid and the anode. Where multiple anodes are employed, one or more of these anodes may be interposed between the accelerator grid and the control grid, but, nevertheless, there still will be another anode provided such that the accelerator grid will be interposed between it and the control grid. Anodes 26 and 27 are connected together and to aluminized coating 15*a*.

In operation control grid 23 is biased negative relative to the D.C. potential of cathode 24. Accelerator grid 25, on the other hand, is biased positive relative to the D.C. potential of cathode 24, as are anodes 26 and 27. Typically the various electrodes may be at the following D.C. potentials: cathode $+150^V$; control grid $-100^V$; accelerator grid $+500^V$; first anode +25KV; second anode +25KV.

A spot killer network embodying the instant invention is shown connected to accelerator grid 25 and now will be discussed. This spot killer network includes an accelerator grid power supply 29, a unidirectional conducting device 30 in the form of a diode and a capacitor designated C1. One terminal 31 of power supply 29 may be at a potential of, say +500 volts, while the other terminal 32 of the power supply is grounded. Terminal 31 is connected via diode 30 to accelerator grid 25. Capacitor C1 is connected in a circuit to be charged from power supply 29 via diode 30.

When the television receiver is turned on, all of the power supplies, including accelerator grid power supply 29, are energized. Once power supply 29 is energized, capacitor C1 will charge quickly through diode 30 to the potential of terminal 31 because of the low forward resistance of diode 30. Consequently, accelerator grid 25 will quickly assume substantially the potential of terminal 31. On the other hand, when the receiver is turned off, capacitor C1 will discharge only very slowly through diode 30 because of its high reverse resistance, so that the high positive potential on accelerator grid 25 will be maintained for a substantial period of time following turn off of the receiver. It will be noted that diode 30 provides the sole path externally connected to capacitor C1 for discharging the capacitor. This path has a very high resistance (the reverse biased junction of diode 30), typically of the order of $10^{14}$ ohms, thereby assuring that accelerator grid 25 will remain at its normal positive D.C. operating potential relative to the potential of cathode 24 for a substantial period of time (typically of the order of two hours or more to discharge to 50 percent of the potential across it during normal operation of the receiver) after deenergization of power supply 29. As described heretofore, when the receiver is turned off, the relatively high positive potential of accelerator grid 25 propels electrons from cathode 24 and causes these electrons to discharge the high voltage capacitor of the picture tube before the raster collapses. This high voltage capacitor is constituted by aluminum film 15*a*, a conductive film 15*b* on the outside of picture tube 15 and the part of the glass of the picture tube that is sandwiched between the two films. The fact that capacitor C1 can discharge only slowly through diode 30 ensures that the potential of accelerator grid 25 will be maintained for a sufficient period of time to accomplish this objective. The operation of the spot killer network is not adversely affected by turning the receiver on and off rapidly because capacitor C1 will charge quickly through diode 30 each time that the receiver is turned on and, in any event, retains its charge for a long time, as noted above.

In practice it has been found for many picture tubes that damage will result to the screen thereof if a spot is permitted to persist for five seconds or more after the receiver has been turned off. The higher the potential difference between the accelerator grid and cathode, the shorter will be the persistence time of the spot. It is not difficult, in accordance with this invention, to achieve a persistence time of about two seconds.

While a preferred embodiment of the invention has been disclosed herein, those skilled in the art will appreciate that changes and modifications may be made therein without departing from the spirit and scope of the invention as defined in the appended claims.

What I claim as my invention is:

1. In combination with a cathode ray tube having an electron gun including a cathode, a control grid, an accelerator grid and at least one anode, said control grid being positioned between said cathode and said accelerator grid and said accelerator grid being positioned between said anode and said control grid and means for applying to said accelerator grid and to said anode positive D.C. voltages relative to the D.C. voltage of said cathode, the improvement wherein said means for applying said relatively positive D.C. voltage to said accelerator grid includes a source of potential, a unidirectional conducting device connected between said source and said accelerator grid and a capacitor connected to said accelerator grid and also connected to be charged via said unidirectional conducting device, said unidirectional conducting device being reverse biased upon removal of the potential of said source and providing the sole path externally connected to said capacitor for discharge of said capacitor, said path having a very high resistance to maintain said accelerator grid at its normal positive D.C. operating potential relative to the potential of said cathode for a substantial period of time after the potential of said source has been removed.

2. The invention according to claim 1 wherein said unidirectional conducting device is a diode.

3. The invention according to claim 2 wherein said diode, said capacitor and said source of D.C. potential are connected in series with each other and wherein said accelerator grid is connected to the common terminal of said diode and said capacitor.

* * * * *